(12) United States Patent
Albarran

(10) Patent No.: US 9,023,143 B2
(45) Date of Patent: *May 5, 2015

(54) ACOUSTIC BUILDING MATERIAL EMPLOYING CHITOSAN

(75) Inventor: Enrique L. Albarran, Waukegan, IL (US)

(73) Assignee: USG Interiors, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/885,812

(22) PCT Filed: Dec. 28, 2011

(86) PCT No.: PCT/US2011/067562
§ 371 (c)(1),
(2), (4) Date: May 16, 2013

(87) PCT Pub. No.: WO2012/092358
PCT Pub. Date: Jul. 5, 2012

(65) Prior Publication Data
US 2013/0234058 A1 Sep. 12, 2013
US 2014/0034866 A9 Feb. 6, 2014

Related U.S. Application Data

(63) Continuation-in-part of application No. 13/294,200, filed on Nov. 11, 2011.

(60) Provisional application No. 61/427,643, filed on Dec. 28, 2010.

(51) Int. Cl.
| | | |
|---|---|---|
| E04B 9/00 | (2006.01) |
| C08L 3/02 | (2006.01) |
| C08L 5/08 | (2006.01) |
| C08L 97/02 | (2006.01) |
| E04B 9/04 | (2006.01) |
| E04F 13/16 | (2006.01) |

(52) U.S. Cl.
CPC .............. *E04B 9/001* (2013.01); *C08L 2666/26* (2013.01); *C08L 5/08* (2013.01); *C08L 3/02* (2013.01); *C08L 97/02* (2013.01); *E04B 9/04* (2013.01); *E04B 2103/02* (2013.01); *E04F 13/16* (2013.01)

(58) Field of Classification Search
CPC ............. C08L 3/02; C08L 5/08; C08L 97/06; C08L 2666/26; C08L 101/12
USPC .................. 106/122, 162.2; 524/29
See application file for complete search history.

(56) References Cited

U.S. PATENT DOCUMENTS

| | | |
|---|---|---|
| 1,769,519 A | 7/1930 | King et al. |
| 5,250,153 A | 10/1993 | Izard et al. |
| 5,395,438 A | 3/1995 | Baig et al. |
| 8,028,803 B1 | 10/2011 | Englert |
| 8,133,354 B2 | 3/2012 | Baig |
| 2006/0182981 A1 | 8/2006 | Debergalis et al. |
| 2006/0194026 A1 | 8/2006 | Blair et al. |
| 2009/0068430 A1 | 3/2009 | Troger et al. |
| 2009/0252922 A1 | 10/2009 | Debergalis et al. |

FOREIGN PATENT DOCUMENTS

| | | | |
|---|---|---|---|
| CN | 103205043 A | | 7/2013 |
| CN | 103205043 A | * | 7/2013 |
| JP | 08-290949 A | | 11/1996 |
| JP | 2001-316162 A | | 11/2001 |
| WO | 0017121 A1 | | 3/2000 |

OTHER PUBLICATIONS

International Search Report and Written Opinion dated Sep. 3, 2012 of International PCT Application No. PCT/US2011/067562, filed Dec. 28, 2011.

* cited by examiner

*Primary Examiner* — David M Brunsman
(74) *Attorney, Agent, or Firm* — Pearne & Gordon LLP

(57) ABSTRACT

A cast ceiling tile and method for manufacture incorporates chitosan in an amount sufficient to provide improved strength.

12 Claims, No Drawings

ACOUSTIC BUILDING MATERIAL EMPLOYING CHITOSAN

This application is a continuation-in-part of U.S. application Ser. No. 13/294,200, filed Nov. 15, 2011, which in-turn, claims the priority of U.S. Provisional Application No. 61/427,643, filed Dec. 28, 2010.

FIELD OF INVENTION

The field relates to building materials for construction and, more particularly, to ceiling tiles containing homogenously dispersed chitosan within the tile construction.

BACKGROUND OF INVENTION

The building materials or ceiling tiles are used in the building trades to provide original ceiling structures or replacement covering ceiling structures. The ceiling tiles may be directly mounted to a building surface or they may be mounted in a suspended ceiling arrangement using a grid support fixed to the building structure. The tiles are prepared from a slurry of fibers, fillers and binders.

Of particular interest herein, the tiles are prepared using compositions and cast procedures such as those disclosed in U.S. Pat. Nos. 5,395,438 and 1,769,519. According to these patent teachings, a molding composition comprising fibers, fillers, colorants and a binder, in particular a starch gel, is prepared for molding or casting the body of the tile. This mixture or composition is placed upon suitable trays and then the composition is screeded to a desired thickness with a screed bar or roller. The trays filled with the composition are then placed in an oven to dry or cure the composition. The dried sheets are removed from the trays and may be treated on one or both faces to provide smooth surfaces, to obtain the desired thickness and to prevent warping. The sheets are then cut into tiles of a desired size.

Chitosan or poly-D-glucosamine is commercially available as a deacetylated form of chitin which is a structural element in the exoskeleton of crustaceans and the cell walls of certain fungi. It is a cationic polymer similar to cellulose. Chitosan has been found to promote blood clotting and it has been used in bandages. It is a biocide and has special properties that enhance antimicrobial and antifungal activities. Chitosan is also used as a flocculent in the water filtration of heavy metals. Chitosan is also indicated to absorb formaldehyde and odor.

BRIEF DESCRIPTION OF THE INVENTION

Chitosan has been found to be a multifunctional additive to fiber board that may be incorporated directly into the slurry formulation. The chitosan is dissolved in acid and added directly to the slurry as a dilute solution. In this manner, the chitosan is uniformly dispersed through the board construction with no substantial change in the manufacturing process.

The use of chitosan in ceiling tile constructions enables a number of advantages in the resulting product. For example, chitosan concentrations less than about 10 wt % provide structural reinforcement sufficient to permit reduction of the amount of binder. This results in a cost saving since the binder is an expensive ingredient in the fiber board composition.

A further advantage of incorporating chitosan in board constructions is that it enhances and contributes to the binding of the components and enables recycle content to be increased. That is, the amount of binder may be decreased and increased amounts of recycle cellulose may be used.

Most surprisingly, the incorporation of chitosan in the board construction has also been found to enhance dewatering or water removal from the board constructions as they are formed and to reduce the drying requirement. In the casting process, the water removal from the board construction is improved prior to the oven drying step and the amount of drying required is reduced. In tile constructions including chitosan in accordance with the invention, the amount of water removed in the dewatering steps prior to oven drying is increased as compared with identical tile constructions and processing except for the addition of chitosan. Therefore, the amount of water to be removed in a final oven drying step is decreased in accordance with the invention. The reduced oven drying requirement saves energy and expense.

The biocidal properties of chitosan are especially useful in ceiling tile applications where high humidity, condensation or other sources of moisture are likely to wet the tile. Such environments are friendly to undesirable microbial and fungal growth which may be deposited by airborne transfer.

The ability of chitosan to absorb formaldehyde is believed to reduce both process and product formaldehyde levels. The odor absorbing properties of chitosan are particularly useful in product applications.

DETAILED DESCRIPTION OF THE INVENTION

As indicated above, chitosan has been found to provide desirable characteristics to building materials, particularly cast ceiling tile compositions, as a multifunctional additive. For convenience, the invention is described below with particular reference to cast ceiling tiles.

The ceiling tiles of interest herein include base fibers that are usually mineral fibers such as mineral wool or similar inorganic fibers. The fillers are commonly perlite, clay, calcium carbonate, glass beads, stucco (calcium sulfate hemihydrate) or gypsum. The binder is typically starch, latex, or similar materials. These materials or ingredients are typically combined in aqueous slurry and processed in a water felting process as described above.

In typical compositions, the fiber and filler components comprise the primary ingredients. However, a wide variation of ingredients may be employed. For example, the following chart summarizes typical cast ceiling tile compositions. It should be appreciated that compositions may contain one or more of the illustrative types of fiber, filler or binder as listed in the following table. The percentages herein are weight percent based on solids unless otherwise indicated by comment or context.

| Ingredient | Range % | Preferred % |
|---|---|---|
| Fiber | | |
| Mineral wool | 60-80% | 65-80% |
| Cellulose fiber (recycle paper) | 0-25% | 3-10% |
| Filler | | |
| Perlite | 15-70% | 30-52% |
| Clay | 0-25% | 4% |
| Calcium carbonate | 0-20% | 10% |
| Glass beads | 0-40% | 20-25% |
| Binder | | |
| Corn starch | 8-20% | 10-15% |
| Latex | 0-5% | 3% |
| Chitosan | 0.5-15% | 2-4% |

The fiber, filler and binder components are combined in aqueous slurry at a level of about 65% to 75% solids in a known manner. The chitosan is dissolved in an acidic aqueous solution and homogenously blended into the slurry. For example, the chitosan in powder or chip form may be dissolved in a 2-4% by volume acetic acid solution and added to the slurry. The chitosan solution is added in an amount that provides a final product weight basis amount in the range of 1% to 6% based on the solids contained in the slurry.

It is believed that the hydrophilic OH and NH groups present in the chitosan enhance the uniform distribution of the chitosan and the thorough penetration and/or contact with the fiber and filler slurry ingredients. Also, the cationic charged chitosan is believed to interact with the starch. Further, the chitosan appears to form a fiber-like structure that is intertwined and/or otherwise interacted with the other fiber components of the tile to provide a structural reinforcement that enables the amount of binder to be reduced with acceptable limited change in the tile physical properties.

As described above, the addition of chitosan to board constructions for ceiling tile or the like reduces the amount of water retained by the construction as it is formed prior to oven drying. The casting process may include natural drainage, application of vacuum and/or roll pressing of the board in order to remove water prior to oven drying. The use of chitosan in accordance with the invention has been found effective to enhance water removal when used with one or more of the foregoing pre-oven drying processes. Accordingly, a chitosan containing board in accordance with the present invention contains less water prior to oven drying than an identically formed board construction having the same composition except for the addition of chitosan.

The following illustrative examples compare boards corresponding with the core of the tile and do not include outer coatings, holes or other finish treatments. The board composition includes mineral wool, starch from corn, stucco, and boric acid. Herein, the board composition was modified to incorporate various amounts of chitosan to demonstrate the binding and reinforcing properties of chitosan.

The absolute amounts of components contained in the prepared boards are reported in following Table 1.

TABLE 1

Formulations

| Board # and % Chitosan | | Cold Water Wool (g) | 1% Acetic Acid (g) | Starch (g) | Stucco (g) | Chitosan (g) | Boric Acid (g) | Mineral Wool (g) |
|---|---|---|---|---|---|---|---|---|
| 1 | Control | 350.0 | 0 | 175 | 141 | 0.0 | 7.5 | 871.0 |
| 2 | 1% | 350.0 | 1.6 | 175 | 141 | 3.3 | 7.5 | 871.0 |
| 3 | 2.5% | 350.0 | 4.2 | 175 | 141 | 8.3 | 7.5 | 871.0 |
| 4 | 5% | 400.0 | 8.5 | 175 | 141 | 17.0 | 7.5 | 871.0 |
| 5 | 10% | 847.0 | 18.0 | 175 | 141 | 36.0 | 7.5 | 871.0 |

Board 1 provides a control with no added chitosan and the typical amount of starch. Boards 2-5 contain increasing amounts of chitosan.

The properties for Boards 1-5 is shown in Table 2.

TABLE 2

Properties

| Board # | Weight (g) | Length (in) | Width (in) | Caliper (in) | Density (lb/ft3) | MOR (psi) | Hardness (psi) |
|---|---|---|---|---|---|---|---|
| 1 | 148.03 | 10.017 | 3.024 | 0.860 | 21.66 | 170.7 | 235.8 |
| 2 | 146.10 | 10.015 | 3.023 | 0.782 | 23.50 | 205.8 | 250.6 |
| 3 | 148.06 | 10.015 | 3.023 | 0.784 | 23.75 | 218.0 | 229.0 |
| 4 | 153.21 | 10.023 | 3.024 | 0.787 | 24.46 | 249.3 | 185.4 |
| 5 | 152.76 | 10.023 | 3.024 | 0.853 | 22.50 | 87.4 | 132.5 |

Boards 1-5 were tested and the results are set forth in above Table 2. The following test procedures were used in determining the test results reported in Table 2.

The MOR test for modulus of rupture is a 3-point bend test. The test procedure herein is similar to ASTM C 367 Standard Test Methods for Strength Properties of Prefabricated Architectural Acoustical Tile or Lay-In Ceiling Panels. The hardness test indicates a ceiling tiles ability to resist indentation which may occur during installation or post-installation. The 2" ball hardness test used herein is similar to ASTM C 367 Standard Test Methods of Strength Properties of Prefabricated Architectural Tile or Lay-In Ceiling Panels.

Comparison of Boards 1 and 2 shows an increase in strength and hardness as indicated by the increased MOR and hardness results. This comparison includes like amounts of binder with the addition of 1% chitosan in Board 2. Thus, the chitosan increased these physical properties.

Boards 3 and 4 show further increases in strength as, indicated by the increased MOR. Board 5 indicates a decrease in strength and MOR upon addition of 10%. It is believed that increases in strength or MOR and/or acceptable physical property values may be achieved by addition of chitosan in amounts greater than 5% and up to about 10% or higher. Presently, a preferred range of chitosan is from about 2% to about 8%. As used herein, acceptable physical properties means tested physical property values at least equal to about 95% of the values provided by an identically formed ceiling tile using the same ingredients except for the addition of the chitosan.

Even though slightly lower properties values may result, it should be appreciated that the more costly starch ingredient may be reduced in amount in the constructions achieving increased strength or MOR properties and/or hardness. In addition, the recycle newsprint may be increased in amount to replace the reduced starch content and to thereby increase the recycle and postindustrial/postconsumer content of the tile.

Board 5 is characterized by a decrease in strength and hardness greater than 5% of the control value. Such a decrease is presently deemed to exceed acceptable physical property values.

The following boards were prepared using casting procedures as described above to evaluate mold resistance. The board compositions based on the total dry ingredients are summarized in the following Table 3.

TABLE 3

Compositions Based on Total Dry Ingredients

| Ingredient | Range Weight % |
|---|---|
| Starch | 3-4.3 |
| Stucco | 3-14 |
| Chitosan | 0.05-2 |
| Boric Acid | 0.18-0.75 |

In accordance with the foregoing formulations, boards 6-7 were prepared and tested for their resistance to mold based on ASTM D3273-00 (reapproved 2005). Board 6 was a control and contained no chitosan, board 7 contained 5% chitosan and board 7 contained 10% chitosan. The board faces and backs were evaluated after two weeks and after four weeks exposure. The board faces and backs were inspected and assigned a value of 0-10 with 0 indicating continuous disfigurement over the entire sample surface and 10 indicating the sample to be entirely free of disfigurement by particulate matter. The results are reported below in Table 4 Mold Resistance. The test results are reported in following Table

TABLE 4

Mold Resistance

| Board # | Chitosan (%) | Mold Value Face (2 Week) | Mold Value Back (2 week) | Mold Value Face (4 week) | Mold Value Back (4 week) |
|---|---|---|---|---|---|
| 6 | 0 | 10 | 10 | 7 | 7 |
| 7 | 5 | 10 | 10 | 9 | 9 |
| 8 | 10 | 10 | 10 | 10 | 10 |

As shown in Table 4, the use of chitosan inhibits mold formation. The board surfaces are substantially free of disfigurement. The mold resistant improvements of chitosan with an increase in strength and MOR values.

Additional control, 5% chitosan and 10% chitosan formulations are shown below.

Control

| | Weight (g) | Solids Weight (g) | % Total | % Solids |
|---|---|---|---|---|
| Gel Formula | | | | |
| Cold Water | 350.0 | 0.0 | 10.79 | |
| Hot Water | 2571.0 | 0.0 | 79.24 | |
| Acetic Acid | 0.0 | 0.0 | 0.00 | |
| Starch | 175.0 | 175.0 | 5.39 | 54.39 |
| Stucco | 141.0 | 141.0 | 4.35 | 43.59 |
| Chitosan | 0.0 | 0.0 | 0.00 | 0.00 |
| Boric Acid | 7.5 | 7.5 | 0.23 | 2.32 |
| Total | 3244.5 | 323.5 | 100.00 | |
| % Solids | | | | 9.97 |
| Pulp Formula | | | | |
| Gel | 3244.5 g | | | |
| Mineral Wool | 871.0 g | | | |
| Total | 4115.5 | | | |

Control

| Pulp Percentages | % Total | % Solids |
|---|---|---|
| Wool | 21.16 | 72.92 |
| Starch | 4.25 | 14.65 |
| Stucco | 3.42 | 11.64 |
| Boric Acid | 0.18 | 0.63 |
| Chitosan | 0.00 | 0.00 |
| Water | 70.98 | 0.00 |
| Total | 100.00 | 100.00 |

Lab Formula 5% Chitosan (85% deacetylated)

| | Weight (g) | Solids Weight (g) | % Total | % Solids |
|---|---|---|---|---|
| Gel Formula | | | | |
| Cold Water | 400.0 | 0.0 | 12.31 | |
| Hot Water | 2500.0 | 0.0 | 76.95 | |
| Acetic Acid | 8.5 | 0.0 | 0.26 | |
| Starch | 175.0 | 175.0 | 5.39 | 51.39 |
| Stucco | 141.0 | 141.0 | 4.34 | 41.41 |
| Chitosan | 17.0 | 7.0 | 0.52 | 5.00 |
| Boric Acid | 7.5 | 7.5 | 0.23 | 2.2 |
| Total | 3249.0 | 359.5 | 100.00 | 100.0 |
| % Solids | | | | 11.06 |
| Pulp Formula | | | | |
| Gel | 3249.5 g | | | |
| Mineral Wool | 871.0 g | | | |
| Total | 4120.5 g | | | |

| Pulp Percentages | % Total | % Solids |
|---|---|---|
| Wool | 21.14 | 71.89 |
| Starch | 4.25 | 14.44 |
| Stucco | 3.42 | 11.64 |
| Boric Acid | 0.18 | 0.62 |
| Chitosan | 0.41 | 1.40 |
| Water | 70.59 | 0.00 |
| Total | 100.00 | 100.00 |

Lab Formula 10% Chitosan (85% deacetylated)

| | Weight (g) | Solids Weight (g) | % Total | % Solids |
|---|---|---|---|---|
| Gel Formula | | | | |
| Cold Water | 847.0 | 0.0 | 26.07 | |
| Hot Water | 2025.0 | 0.0 | 62.32 | |
| Acetic Acid | 10.0 | 0.0 | 0.58 | |
| Starch | 175.0 | 175.0 | 5.39 | 48.69 |
| Stucco | 141.0 | 141.0 | 4.34 | 39.23 |
| Chitosan | 36.0 | 36.0 | 1.11 | 10.00 |
| Boric Acid | 7.5 | 7.5 | 0.23 | 2.09 |
| Total | 3249.5 | 340.5 | 100.00 | 100.0 |
| % Solids | | | | 11.06 |
| Pulp Formula | | | | |
| Gel | 3249.0 g | | | |
| Mineral Wool | 871.0 g | | | |
| Total | 4120.0 g | | | |

-continued

| Pulp Percentages | % Total | % Solids |
|---|---|---|
| Wool | 21.14 | 70.79 |
| Starch | 4.25 | 14.22 |
| Stucco | 3.42 | 11.46 |
| Boric Acid | 0.18 | 0.61 |
| Chitosan | 0.87 | 2.92 |
| Water | 70.14 | 0.00 |
| Total | 100.00 | 100.00 |

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A cast ceiling tile formed from an aqueous slurry of ingredients including fiber, filler, binder and chitosan in addition to said binder, said ingredients being homogenously dispersed throughout the aqueous slurry for interacting of the chitosan with the other of said slurry ingredients whereby the cast ceiling tile formed of the aqueous slurry is structurally reinforced by the chitosan as compared with an identically formed ceiling tile of the same slurry ingredients except for the chitosan, said fiber comprising mineral wool, said filler comprising at least one component of perlite, calcium carbonate, clay and stucco, and said binder comprising at least one component of starch and latex.

2. The cast ceiling tile of claim 1, wherein said chitosan interacts with said ingredients to provide the ceiling tile with increased physical properties including MOR (modulus of rupture) as compared with a ceiling tile identically formed of the same slurry ingredients except for the chitosan.

3. The cast ceiling tile of claim 1, wherein the chitosan is present in an amount from about 0.5 wt % to about 10 wt % based on the total weight of the solids in the aqueous slurry.

4. The cast ceiling tile of claim 1, wherein the chitosan is dissolved in acid solution for addition to the slurry.

5. The cast ceiling tile of claim 1, wherein the slurry includes a reduced amount of binder in accordance with the amount of added chitosan to maintain physical properties and an amount of a recycled cellulose fiber material in accordance with the reduced amount of a binder whereby the postindustrial/postconsumer content of the tile is increased and structural reinforcement is maintained.

6. The ceiling tile of claim 5, wherein the physical properties include MOR (modulus of rupture) and hardness.

7. The cast ceiling tile of claim 1, wherein said chitosan tends to improve the mold resistance of the ceiling tile.

8. The cast ceiling tile of claim 1, wherein said ceiling tile has a composition including on a solids content weight basis:
fiber from about 60% to about 80%,
filler from about 15% to about 70%,
binder from about 3% to about 12%, and
chitosan from about 0.5% to about 10%.

9. A method for making a ceiling tile in a cast process comprising forming an aqueous slurry of ingredients including mineral fiber, filler, binder comprising starch or latex and chitosan in addition to said binder, homogenously dispersing said chitosan in said aqueous slurry, dewatering and drying said slurry to form said acoustical material, said chitosan interacting with the slurry ingredients to structurally reinforce the resulting tile as compared with a cast tile identically formed of the same ingredients except for the chitosan.

10. The method of claim 9, wherein the chitosan is dissolved in acid solution and then added to the slurry.

11. The method of claim 10, wherein said chitosan interacts with said ingredients to provide said cast tile with increased MOR (modulus of rupture) and hardness as compared with a cast tile identically formed of the same ingredients except for the chitosan.

12. The method of claim 9, wherein the chitosan is present in an amount from about 0.5 wt % to about 10 wt % based on the total weight of the solids in the aqueous slurry, and the slurry includes a reduced amount of binder in accordance with the amount of added chitosan to maintain physical properties and an amount of a recycled cellulose fiber material in accordance with the reduced amount of binder whereby the postindustrial/postconsumer content of the building material is increased and structural reinforcement is maintained.

* * * * *

UNITED STATES PATENT AND TRADEMARK OFFICE
CERTIFICATE OF CORRECTION

| | | |
|---|---|---|
| PATENT NO. | : 9,023,143 B2 | Page 1 of 1 |
| APPLICATION NO. | : 13/885812 | |
| DATED | : May 5, 2015 | |
| INVENTOR(S) | : Enrique L. Albarran | |

It is certified that error appears in the above-identified patent and that said Letters Patent is hereby corrected as shown below:

In the specification

Column 1, the paragraph beginning at line 4, should be amended to read as follows:

--This application is a 371 of PCT/US2011/067562, filed December 28, 2011, which PCT application is a continuation-in-part of U.S. Application Ser. No. 13/294,200, filed November 11, 2011, which in turn claims the priority of U.S. Provisional Application No. 61/427,643, filed December 28, 2010.--.

Column 1, line 65, delete the paragraph starting with "Most surprisingly,".

Column 3, line 14, delete the paragraph starting with "As described above,".

Signed and Sealed this
Twenty-ninth Day of December, 2015

Michelle K. Lee
*Director of the United States Patent and Trademark Office*